UNITED STATES PATENT OFFICE.

ARNO BEHR, OF JERSEY CITY, NEW JERSEY.

PROCESS OF MANUFACTURING CRYSTALLIZED ANHYDRIDE OF GRAPE-SUGAR FROM A WATERY SOLUTION OF GRAPE-SUGAR.

SPECIFICATION forming part of Letters Patent No. 250,333, dated December 6, 1881.

Application filed October 18, 1881. (No specimens.)

*To all whom it may concern:*

Be it known that I, ARNO BEHR, of Jersey City, New Jersey, have invented a certain Process of Manufacturing Crystallized Anhydride of Grape-Sugar from a Watery Solution of Grape-Sugar, of which the following is a specification.

Crystallized grape-sugar as heretofore produced from a watery solution consists of the hydrate of grape-sugar, containing in its pure state 9.09 per cent. of water in chemical combination. This water is called "water of crystallization." The crystallized hydrate of grape-sugar loses this water of crystallization if exposed to a temperature of from 160° to 212° Fahrenheit. In form the crystallized hydrate is composed of spherical aggregations of minute tablets.

It has been known that crystallized anhydride of grape-sugar may be produced by dissolving grape-sugar in strong alcohol and crystallizing it from this solution. The anhydride is distinguishable from the hydrate, first, by its crystalline form, which is that of needles or prisms, and, secondly, by the absence of water of crystallization. When the anhydride is pure, if it be exposed to a temperature of from 160° to 212° Fahrenheit it will not lose in weight, while, as has been observed, the hydrate, under similar circumstances, loses about nine per cent. of its weight.

In another application I have described a method of refining grape-sugar, which consists in producing anhydride of grape-sugar by incorporating a small quantity of crystallized anhydride, previously prepared, into a watery solution of grape-sugar concentrated until it contains only about fifteen per cent. of water.

My present invention is based upon my discovery of certain conditions under which crystallized anhydride of grape-sugar may be produced from a watery solution without the introduction into such solution of crystallized anhydride previously prepared. These conditions are, first, that the grape-sugar shall be of great purity, so that the watery solution shall contain upward of ninety-five parts of pure grape-sugar in one hundred parts of dry substance; secondly, that the solution shall be concentrated until it contains only about fifteen per cent. of water; and, thirdly, that after concentration the temperature shall be reduced to a point at which proper crystallization will take place.

The required purification of the grape-sugar is most economically and effectually accomplished by the method of refining described in my other application for a patent hereinbefore referred to. This method consists in concentrating a watery solution of ordinary grape-sugar until it contains only about fifteen per cent. of water, and in stirring into the mass a small quantity of previously-prepared anhydride of grape-sugar, and then depositing the mass in iron molds, which are slowly cooled down to about 85° Fahrenheit, and maintained at this temperature from two to three days, or until the contents of the molds are thoroughly crystallized, after which, preferably by centrifugal force, the liquid is drained from the mass of crystals, thus removing a large portion of the impurities which remain in solution. The remaining crystals may be washed with water or with a solution of grape-sugar, but even without washing they will, upon examination, be found to be greatly improved in purity and taste as compared with the whole mass.

In this refining process it is necessary to avoid the introduction of any crystallized hydrate of grape-sugar, because otherwise a mixed crystallization will take place and the object of the process be frustrated.

Ordinary grape-sugar may be less economically refined by forming crystallized hydrate, but in such case it is necessary to arrest the process of crystallization some time before it is completed, so that there may remain in the crystallized mass interstices sufficiently large to permit the expulsion of the molasses or liquid impurities.

Owing to the peculiar forms of the crystals of anhydride of grape-sugar the process of crystallization may be fully completed. As the anhydride crystals are in the form of prisms and needles, their aggregation does not prevent the existence of interstices large enough to permit the effectual expulsion of the molasses or liquid impurities. It hence follows that, in practice, dealing with a given quantity of ordinary grape-sugar, a larger yield of crystallized anhydride can be obtained than of crystallized hydrate.

The next step in my present process is to remelt the crystals obtained by the first step and form therewith a solution containing about fifteen per cent. of water. This solution or mass is then filled into molds of ordinary construction and allowed to cool to a temperature preferably of about 100° Fahrenheit, at which temperature it is maintained for from twelve to twenty-four hours, or until thorough crystallization has taken place. The mold is then introduced into a centrifugal machine and the liquid having been expelled the crystallized mass is then removed from the mold and dried at a low temperature. The product thus obtained will, upon examination, be found to be crystallized anhydride of grape-sugar of greater sweetness than crystallized hydrate of grape-sugar, which contains the water of crystallization.

The crystallized mass of anhydride is very hard, resembling block or loaf sugar made from cane-sugar, and it may be cut into lumps or crushed or powdered.

It will, of course, be understood that any method of producing or refining grape-sugar of upward of ninety-five per cent. in purity will answer the requirements of my present invention. As ordinary grape-sugar is not sufficiently pure for my purpose I have herein indicated two methods by which it may be refined.

I claim as my invention—

The process of manufacturing crystallized anhydride of grape-sugar herein described, which consists in forming a solution containing about fifteen per cent. of water, with grape-sugar of upward of ninety-five per cent. in purity, and in filling such solution or mass into molds of ordinary construction, and cooling it to a temperature preferably of about 100° Fahrenheit, and holding it at about that temperature for from twelve to twenty-four hours, or until thorough crystallization has taken place, and in then expelling the liquid therefrom by means of a centrifugal machine.

ARNO BEHR.

Witnesses:
M. L. ADAMS,
ASA FARR.